United States Patent [19]

Yoos

[11] 4,436,335
[45] Mar. 13, 1984

[54] APPLIANCE SUPPORTS

[76] Inventor: Charles J. Yoos, 39182 S.R. 517, Lisbon, Ohio 44432

[21] Appl. No.: 338,254

[22] Filed: Jan. 11, 1982

[51] Int. Cl.$^3$ ............................................. B60N 3/10
[52] U.S. Cl. ................... 296/24 R; 248/317; 114/191; 62/239; 296/156
[58] Field of Search .................. 296/24 R, 24 A, 156, 296/168, 164, 24 B; 62/263, 297, 238.3, 239, 476, 240; 114/191–195; 248/317, 610; 211/116; 126/24

[56] References Cited

U.S. PATENT DOCUMENTS

| | | | |
|---|---|---|---|
| 608,050 | 7/1898 | Johnson | 114/191 |
| 938,695 | 11/1909 | Pence | 114/195 |
| 1,083,778 | 1/1914 | Treadwell | 114/195 |
| 2,352,024 | 6/1944 | Sebestyen | 114/193 |
| 3,705,743 | 12/1972 | Toomey | 296/168 |
| 3,861,105 | 1/1975 | Starks | 248/317 |

FOREIGN PATENT DOCUMENTS 167816 8/1921 United Kingdom ................. 114/191

Primary Examiner—Robert B. Reeves
Assistant Examiner—Dennis Pedder
Attorney, Agent, or Firm—Michael Williams

[57] ABSTRACT

The invention is particularly adpated to support refrigerators in recreational vehicles, to maintain the refrigerators in level condition, although the invention may be adapted for use in supporting other appliances, such as stoves and the like. The gas-fired absorption type of refrigerator is the most popular type for travel trailers, but it must be maintained in level condition in order for it to operate properly. My invention provides a support for a refrigerator wherein the latter is always gravity-urged to level condition. Dash pot devices are included to yieldably oppose movement of the refrigerator, so that the latter moves gently from one position to another in accordance with the angularity of the terrain over which the travel trailer travels or on which it is parked. The supporting means may be built as part of the refrigerator at the factory, or it may be offered in kit form for installation on refrigerators already in use or on the market.

6 Claims, 5 Drawing Figures

APPLIANCE SUPPORTS

BACKGROUND AND SUMMARY

The refrigerating unit in travel trailers is usually one of four types; an ice chest, a gas-fired absorption type; an electrically heated absorption type; or an electric compressor type that operates in the same manner as a household refrigerator.

The ice chest is not in use very much any more because the ice melts in time and the water thus created must be drained. Further, it is impossible to freeze food or keep it frozen in an ice chest.

The electrically heated absorption type is similar to the gas-fired type except that an electric heating element produces the heat, and it is not too popular because it, like the electric compressor type, requires a 120 volt source of electricity and this is found only in trailer parks. The Norcold Division of Stolle Corporation produces a refrigerator that will operate on LP gas or 120 volt AC power, or 12 volt DC power, the latter for holding temperature while on the road.

However, the gas-fired absorption type refrigerator is the most popular type for travel trailers. It operates off the propane gas system that also operates the gas lights, the stove and oven, and the gas hot-water heater. It is compact, clean and quiet, and works very efficiently. The system uses gravity to operate, thus eliminating the need for any compressors, expansion valves or capillary tubes, but this means that it is essential for the refrigerator to be level; otherwise the flow of refrigerant will be restricted and the unit will not cool. The above-mentioned Norcold refrigerator has an off-level tolerance of 3° side-to-side and 6° front-to-back, but road and trailer park conditions frequently cause the trailer to tilt in excess of such tolerances.

My invention makes it possible to support a refrigerator in such manner that the latter will always seek a level condition. The reason for a level requirement for a gas-fired absorption type refrigerator has been given above, but it is equally important to maintain any other type refrigerator level so that food contained therein does not pile up at one side, or spill. A level requirement for a stove would be of equal importance in order to cook properly.

In carrying out my invention, the appliance either has a built-in leveling device, or the device may come in kit form to be applied to existing appliances. Since the invention has greatest application to refrigerators (particularly of the gas-fired type) the invention will henceforth be described in that environment.

My leveling device comprises a universal support from which the refrigerator is suspended, whereby the weight of the refrigerator will always urge the refrigerator to level condition. Dash pots are used to dampen shifting movement of the refrigerator to a gentle manner.

DESCRIPTION OF THE DRAWINGS

In the drawings accompanying this specification and forming a part of this application, there is shown, for purpose of illustration, an embodiment which my invention may assume, and in these drawings.

DESCRIPTION OF THE PREFERRED EMBODIMENT

Figure 1:
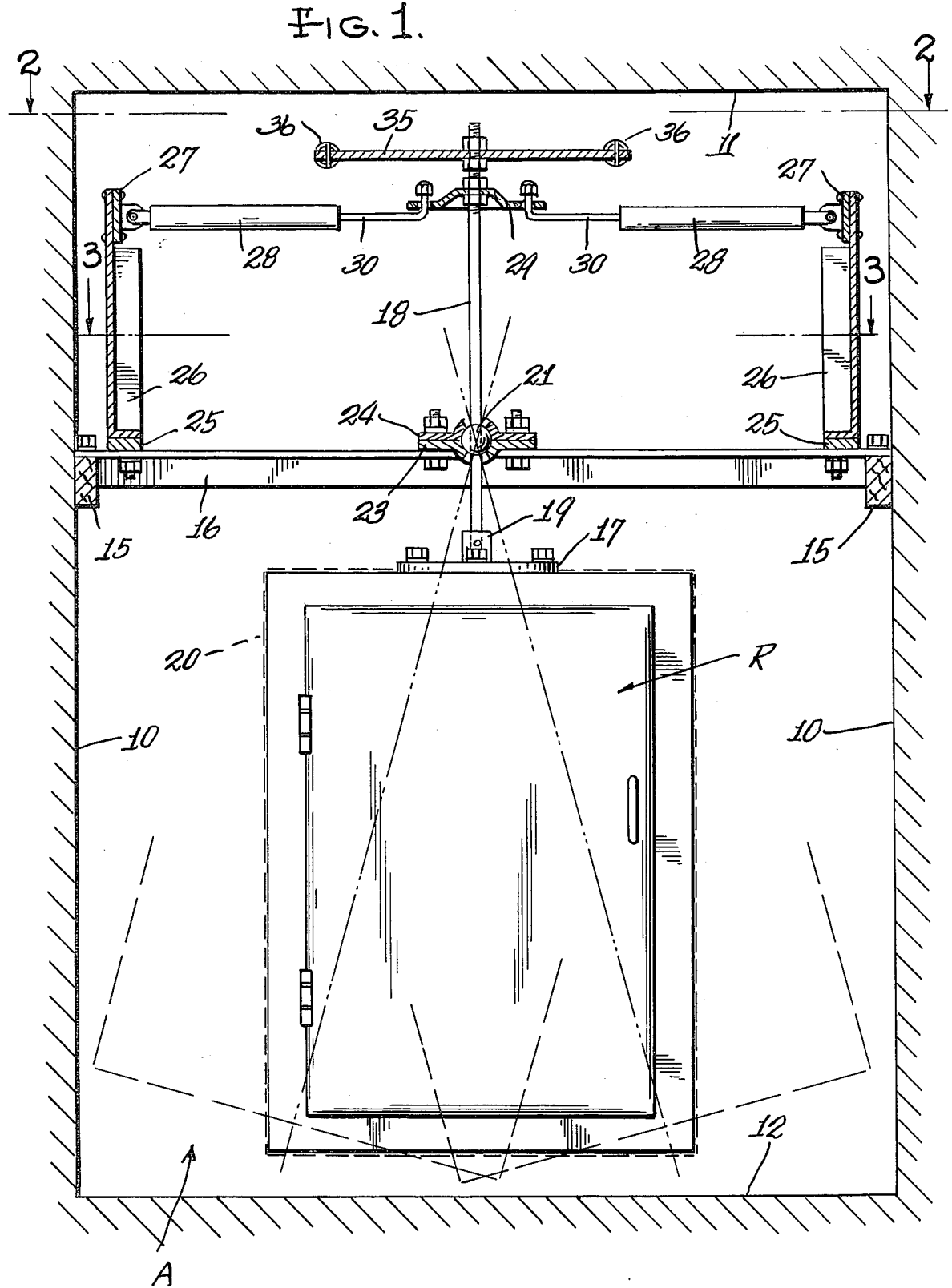
FIG. 1 is a vertical sectional view, corresponding to the line 1—1 of FIG. 2.
Figure 2:
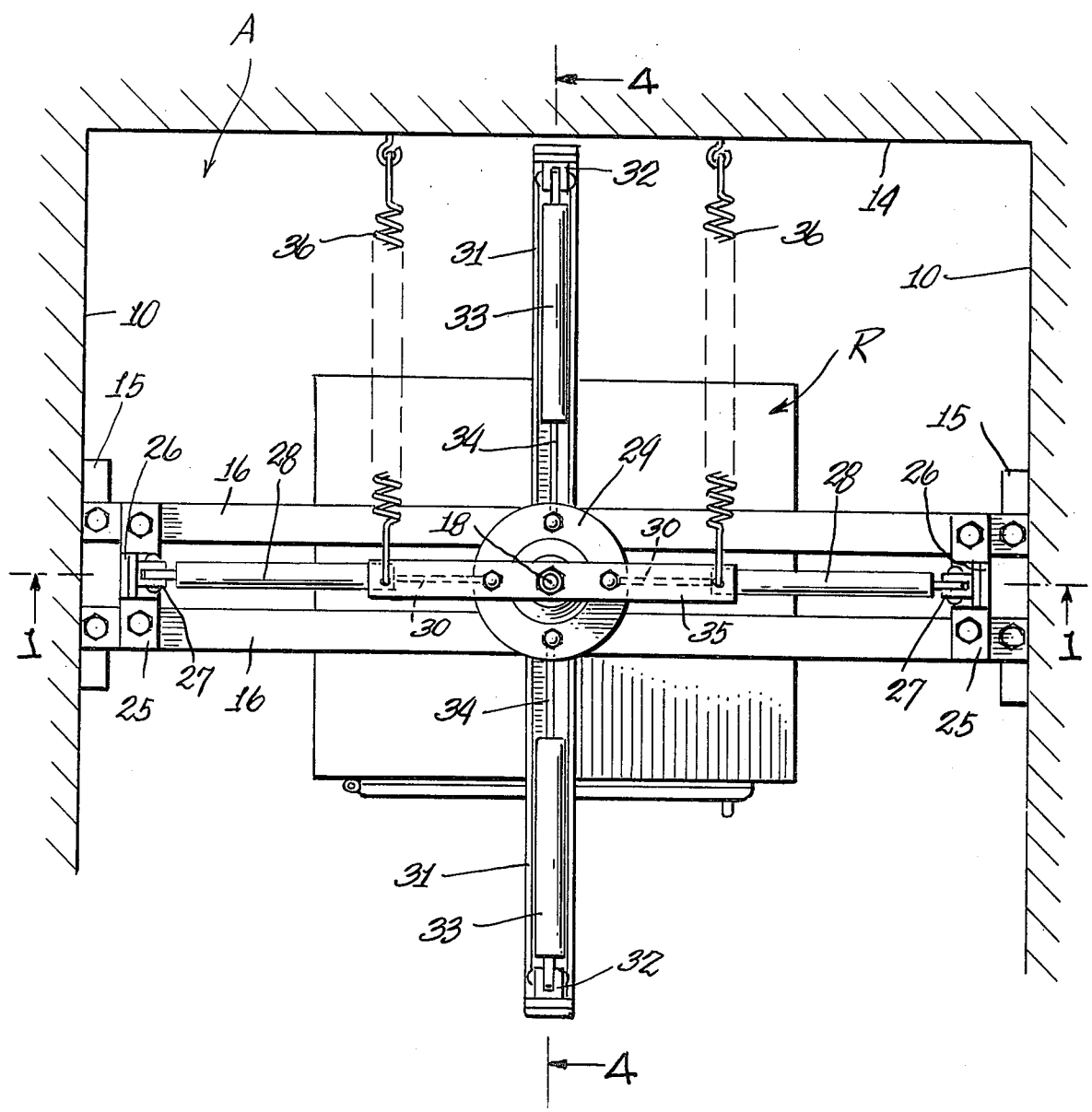
FIG. 2 is a horizontal sectional view, corresponding to the line 2—2 of FIG. 1.

In FIG. 1, the refrigerator is shown supported in an alcove A in the travel trailer, the alcove having side walls 10—10, a top wall 11, a bottom wall 12 and a rear wall 14 (see FIG. 2). All of the aforementioned walls are not necessary, but side and rear walls are needed to provide support for my improved leveling device.

The refrigerator R is shown suspended for universal swinging movement and in the presently disclosed embodiment the suspension is carried by cleats 15 which are secured to the opposite side walls 10—10 in any suitable manner and a predetermined distance above the floor 12. A pair of angle irons 16—16 have their opposite ends bolted to the cleats 15, the angle irons extending between the side walls in spaced-apart manner.

In the presently disclosed embodiment, the universal suspension comprises a ball and socket joint that is carried by the angle irons 16. A plate 17 is bolted to the top of the refrigerator and the lower end of a rod 18 is seated and secured within a socket 19 extending upwardly from the plate. In some cases, the upper surface of the refrigerator is not capable of supporting any great amount of weight and in such cases the plate may be held up to the top of the refrigerator by straps 20 (shown in dash lines in FIG. 1) which extend vertically and around the refrigerator. A ball 21 is on the rod 18 a predetermined distance above the refrigerator, the ball being seated within a socket formed in a pair of rectangular plates 23 and 24 which are bolted together and to the angle irons 16.

A support bar 25 straddles the angle irons at each of the ends thereof, and is bolted thereto. Welded to each bar 25 and extending upwardly therefrom is a channel 26. A pivot plate 27 is fixed to the upper end of each channel, and the blank or closed end of a dash pot 28 is pivotally connected to ears on the plate as seen in FIGS. 1 and 2. Clamped between nuts near the refrigerator upper end of the rod 18 is a disc 29 and the rod 30 of each dash pot is connected to the disc.

Figure 3:
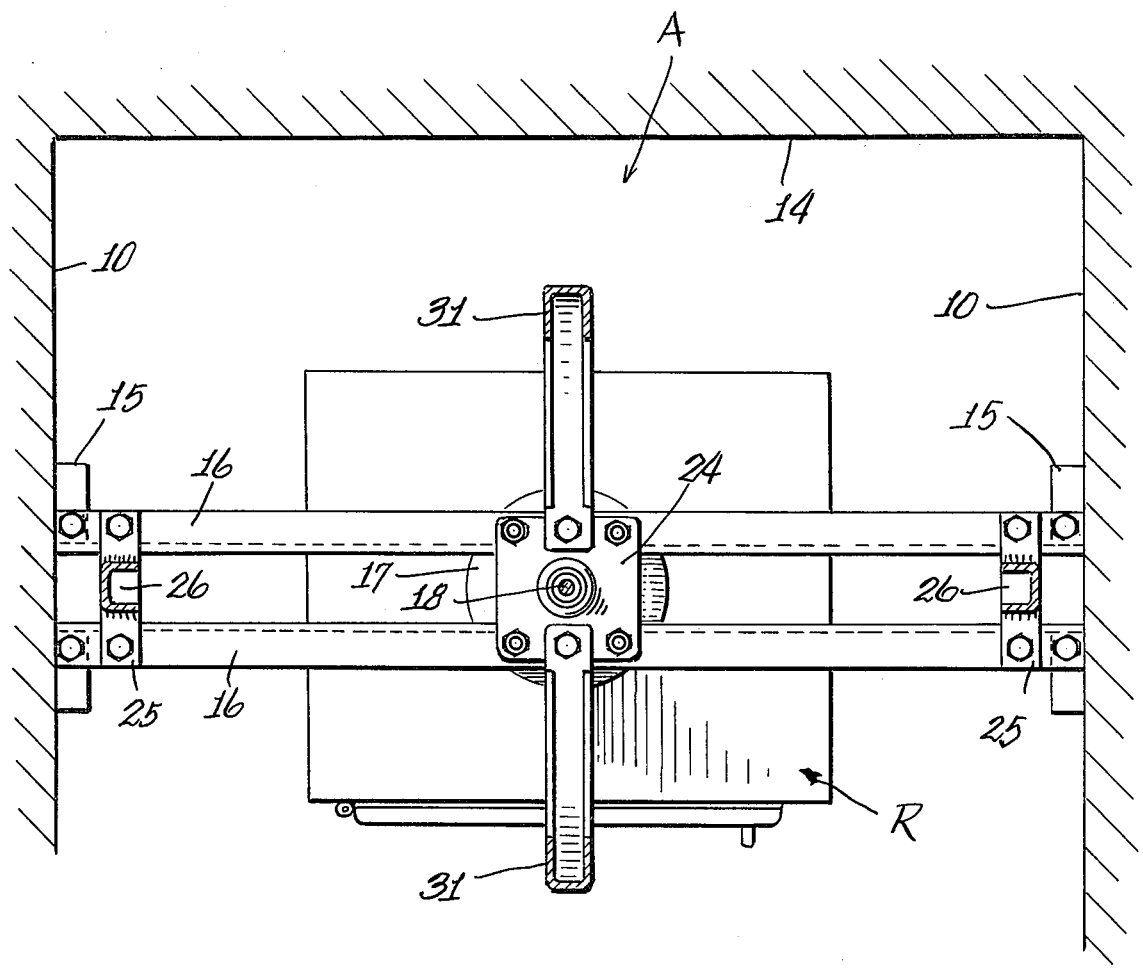
FIG. 3 is a horizontal sectional view, corresponding to the line 3—3 of FIG. 1.
Figure 4:
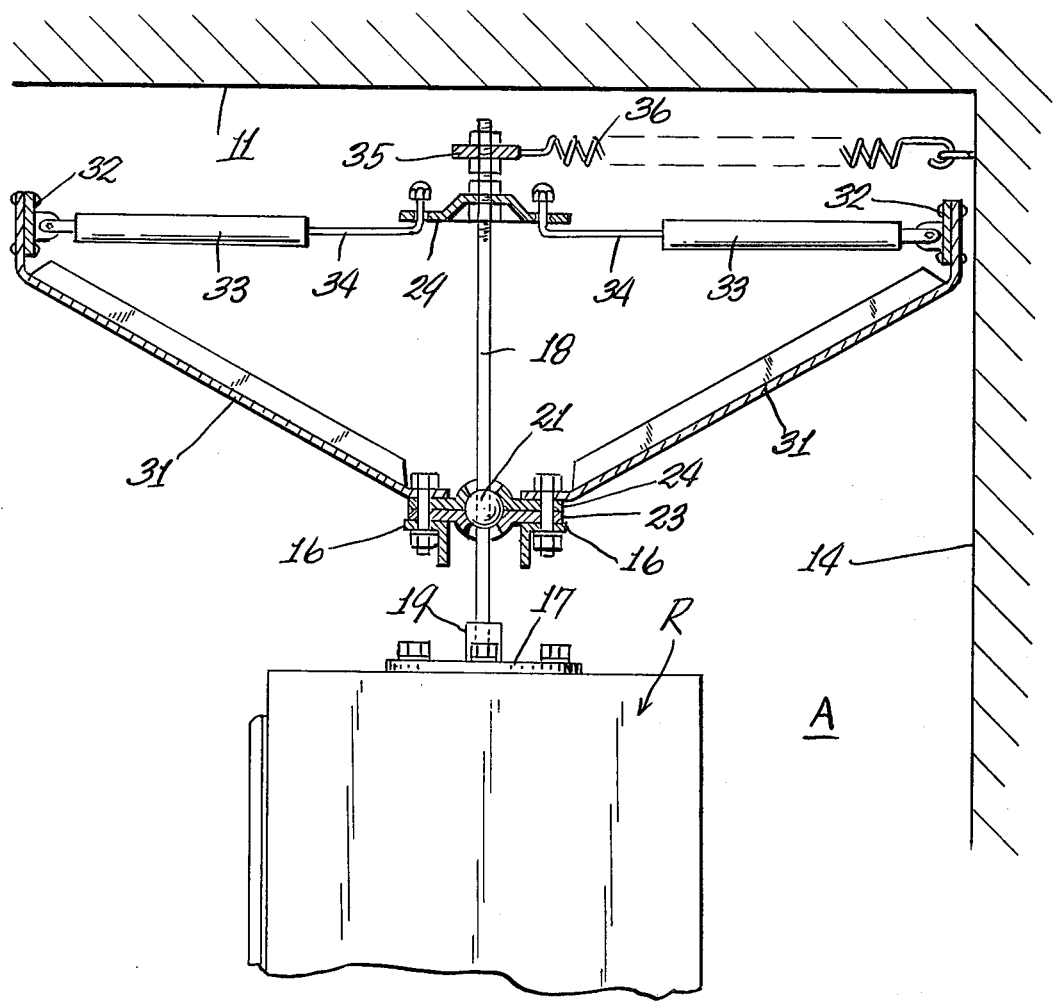
FIG. 4 is a fragmentary vertical sectional view, corresponding to the line 4—4 of FIG. 2.

As seen in FIGS. 2, 3 and 4 two channels 31—31 are disposed at right angles to the channels 26 and each has its lower end bolted to the rectangular plates 23 and 24, and to respective angle irons 16. Each channel 31 extends upwardly and outwardly from its lower end, and a pivot plate 32 is fixed to its upper end. The blank end of a dash pot 33 is pivoted to ears on the pivot plate, and the rod 34 is connected to the disc 29.

Figure 5:
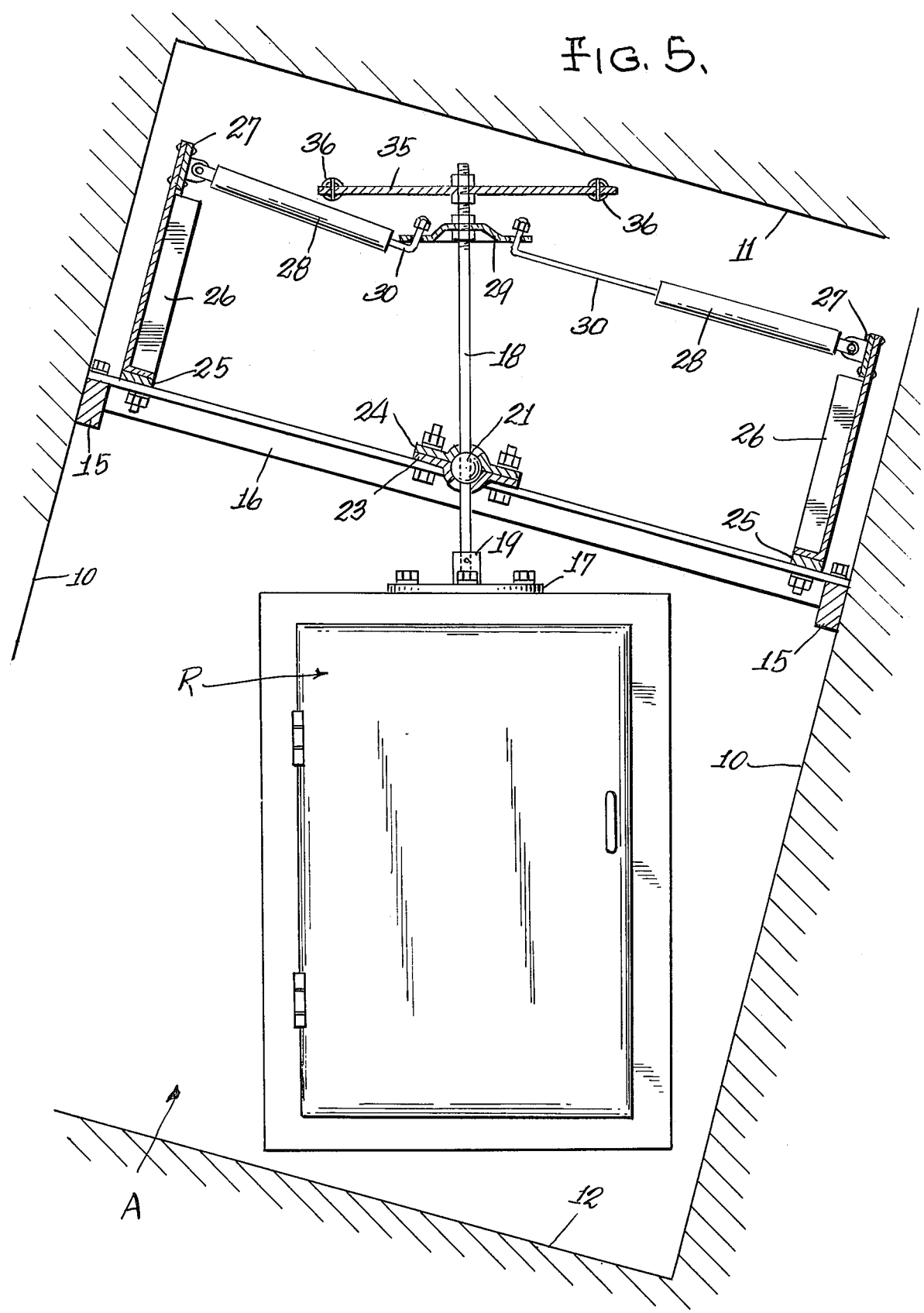
FIG. 5 is a view similar to FIG. 1 but showing the travel trailer in tilted condition, but with the refrigerator level.

As seen in FIG. 2 the dash pots 28—28 and 33—33 extend axially from the disc 29 and are ninety degrees apart. As suggested in FIG. 1 the refrigerator R may swing in any direction about the ball suspension, but the dash pots insure that the swing is in a gentle manner. FIG. 5 shows the travel trailer at a severe angle, but the forces of gravity will maintain the refrigerator level.

In order to prevent the refrigerator R from rotating about the vertical axis of the rod 18, a bar 35 is clamped between nuts at the upper end of the rod, and two coil springs 36 each have an end connected to an end of the bar and an opposite end connected to the rear wall 14.

It will be appreciated that the suspension hereinbefore described may be made available in kit form so that only the cleats 15 need be installed in the trailer alcove. The kit may be supplied in assembled relation whereby the angle irons 16 need to be bolted to the cleats 15, and the plate 17 need be connected to the top part of the refrigerator. Optionally, the kit may be also supplied in knock-down form for better packaging and thus economy in shipping, the kit in this condition being supplied with a detailed set of assembly instructions.

I claim:

1. A support for a refrigerator housed in a travel trailer, comprising:
   support means rigidly connected to a surface of said trailer and disposed above a floor space of said trailer a distance greater than the height of said refrigerator,
   a rod rigidly secured to said refrigerator and extending upwardly therefrom to said support means,
   a ball and socket connection between the refrigerator rod and said support means thereby to suspend said refrigerator and permit it to swing to level condition when said travel trailer is in any tilted position,
   a plurality of dash pots having the cylinders and rods thereof respectively interconnected between said refrigerator rod and a laterally adjacent surface of the trailer with said dash pots in angular spaced relation about the axis of said refrigerator rod, thereby to dampen oscillation movements of said refrigerator and refrigerator rod, and,
   means connected to said rod and to a wall of said trailer to restrain movement of said refrigerator rod about its longitudinal axis, thereby to prevent said refrigerator from excessively rotating during any tilting movement.

2. The construction according to claim 1 wherein said support means is in the form of a pair of horizontally disposed angle irons extending crosswise of spaced walls of an alcove in which the refrigerator is housed,
   a pair of plates secured to said angle irons and providing a socket therebetween for receiving said ball.

3. The construction according to claim 2 wherein said refrigerator rod extends upwardly from said ball, and
   with said last-named means connected to the upper end of said rod for restricting free swinging movement of said refrigerator.

4. The construction according to claim 3 wherein a first set of channels are rigidly connected to opposite ends of said angle irons and extend upwardly therefrom,
   a disc is rigidly secured to the upper end of said refrigerator rod, and
   a first pair of said dash pots, each having a blank end, are pivotally connected to an upper end of a respective one of said channels, and the dashpot rod is pivotally connected to said disc.

5. The construction according to claim 4 wherein a second set of channels are rigidly connected and extend upwardly and outwardly of said angle irons and are disposed at right angles to said first set of channels, and
   a second pair of said dash pots, each having its blank end pivotally connected to an upper end of a respective one of said second set of channels, and the dashpot rod is pivotally connected to said disc.

6. The construction according to claim 5 and further including a bar fixed to the upper end of said refrigerator rod and having ends on opposite sides of said refrigerator rod, and
   wherein said last-named means is spring tension means between each end of said bar and a wall of said travel trailer to restrict rotation of said refrigerator about the axis of said refrigerator rod.

* * * * *